United States Patent
Friedman

(10) Patent No.: US 6,714,791 B2
(45) Date of Patent: Mar. 30, 2004

(54) SYSTEM, APPARATUS AND METHOD FOR LOCATION-BASED INSTANT MESSAGING

(75) Inventor: Jackie Friedman, Seattle, WA (US)

(73) Assignee: Danger, Inc., Palo Alto, CA (US)

( * ) Notice: Subject to any disclaimer, the term of this patent is extended or adjusted under 35 U.S.C. 154(b) by 403 days.

(21) Appl. No.: 09/792,547

(22) Filed: Feb. 23, 2001

(65) Prior Publication Data

US 2002/0119789 A1 Aug. 29, 2002

(51) Int. Cl.[7] .................................................. H04Q 7/20
(52) U.S. Cl. .................. 455/456.1; 455/457; 455/456.2; 455/412.1; 455/414.1; 455/519; 455/41.2; 709/202; 709/204; 709/206; 709/209; 707/1; 707/3; 707/9
(58) Field of Search .................... 455/456.1, 412.1, 455/414.1, 519, 41.2, 456.2, 457; 709/202, 204, 206, 209; 707/1, 3, 9

(56) References Cited

U.S. PATENT DOCUMENTS

| | | |
|---|---|---|
| 5,537,460 A | 7/1996 | Holliday, Jr. et al. |
| 5,982,281 A | 11/1999 | Layson, Jr. |
| 6,104,712 A | 8/2000 | Robert et al. |
| 6,301,609 B1 * | 10/2001 | Aravamudan et al. ...... 709/207 |
| 6,539,232 B2 * | 3/2003 | Hendrey et al. ............ 455/456 |
| 6,542,748 B2 * | 4/2003 | Hendrey et al. ............ 455/456 |
| 6,542,749 B2 * | 4/2003 | Tanaka et al. .............. 455/456 |
| 6,542,750 B2 * | 4/2003 | Hendrey et al. ............ 455/456 |
| 2002/0077080 A1 * | 6/2002 | Greene ....................... 455/412 |
| 2002/0101993 A1 * | 8/2002 | Eskin ......................... 380/270 |
| 2002/0115446 A1 * | 8/2002 | Boss et al. .................. 455/456 |

FOREIGN PATENT DOCUMENTS

WO WO00/50844 8/2000

OTHER PUBLICATIONS

Copy of PCT Search Report dated Dec. 4, 2002, 3 pages.

* cited by examiner

Primary Examiner—William Trost
Assistant Examiner—Danh C Le
(74) Attorney, Agent, or Firm—Blakely, Sokoloff, Taylor & Zafman LLP

(57) ABSTRACT

A computer-implemented method comprising: transmitting positional data identifying a wireless device's position responsive to a first user transmitting a message from the wireless device to one or more other users; and transmitting the positional data to the one or more other users.

35 Claims, 11 Drawing Sheets

SYSTEM, APPARATUS AND METHOD FOR LOCATION-BASED INSTANT MESSAGING

BACKGROUND OF THE INVENTION

1. Field of the Invention

This invention relates generally to the field of network data services. More particularly, the invention relates to an apparatus, system and method for providing voice portal services on a wireless network.

2. Description of the Related Art

"Portals" are World Wide Web ("WWW") sites which help users manage and navigate through vast amounts of information stored on the Internet. Some well known Internet portals include "Yahoo!®," AltaVista ®, and Excite®. Portals typically provide search features which allow users to search for particular types of content by entering keywords. In response to the keyword search request, the portal returns links to relevant Internet sites and/or relevant content stored directly on the portal. For example, if a user enters the keyword "snowboarding," the portal may return a list of hyperlinks to Internet sites related to snowboarding as well as internal portal categories related to snowboarding (e.g., "Recreation >Sports >Snowboarding").

In addition to the keyword search and content management capabilities described above, portals may also provide users with a variety of network applications such as, for example, email, electronic scheduling and contact management, chat groups, newsgroups, personal financing, and instant messaging, to name just a few.

"Instant messaging" refers generally to the ability to send and receive messages over a network in real time. Various types of instant messaging services may be provided by portals and internet service providers (e.g., America Online). Typically, an instant messaging program (also commonly referred to as "buddy list" program) installed on a client computer or wireless device may be programmed to inform users when any individuals in their list of "buddies" (e.g., colleagues, workgroup members, friends, . . . etc) log onto the network so they can communicate (e.g., via instant messaging, chat groups, email, etc). The program also notifies them if a "buddy" sends them an instant message.

SUMMARY

A computer-implemented method comprising: transmitting positional data identifying a wireless device's position responsive to a first user transmitting a message from the wireless device to one or more other users; and transmitting the positional data to the one or more other users.

BRIEF DESCRIPTION OF THE DRAWINGS

A better understanding of the present invention can be obtained from the following detailed description in conjunction with the following drawings, in which.

DETAILED DESCRIPTION OF PREFERRED EMBODIMENTS

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

AN EXEMPLARY NETWORK ARCHITECTURE

Figure 1:
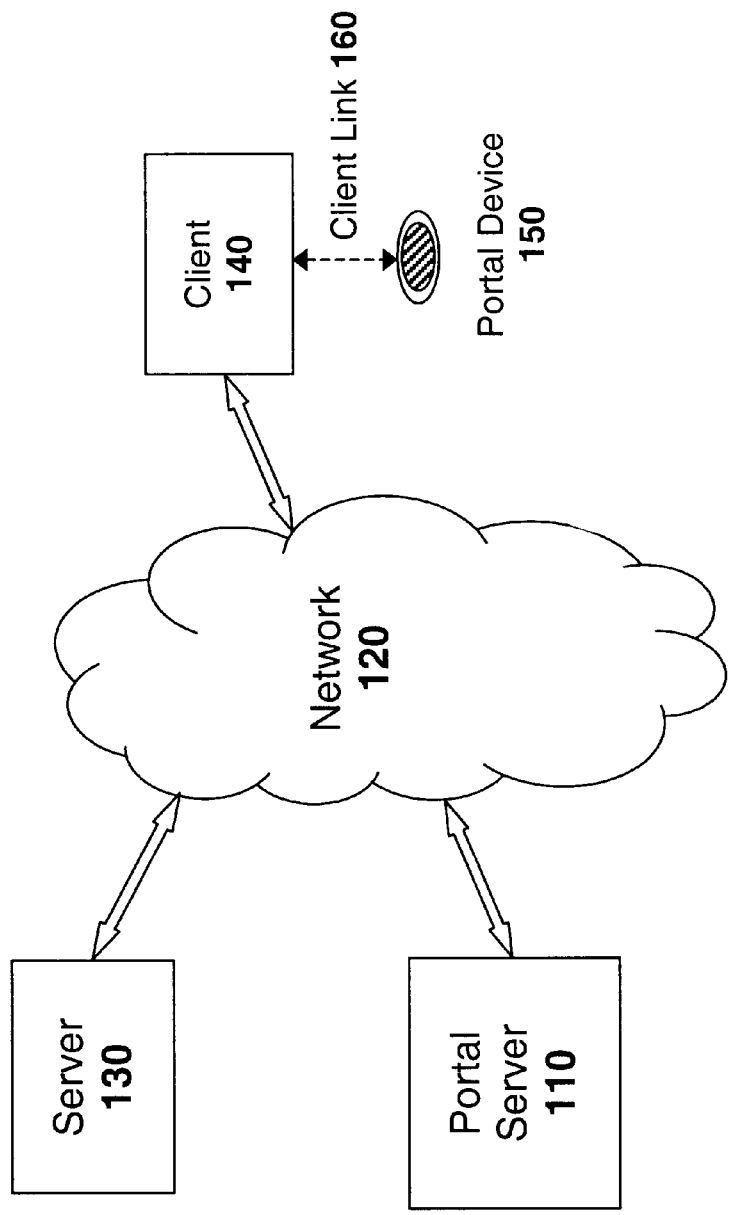
FIG. 1 illustrates an exemplary network architecture used to implement elements of the present invention.

Elements of the present invention may be included within a client-server based architecture 100 such as that illustrated in FIG. 1. According to the embodiment depicted in FIG. 1, a portal server 110 communicates with clients 140 and other network servers 130 over a network 120 (e.g., the Internet). The network 120 over which the clients 140 and servers 110, 130 transmit and receive data may be comprised of any combination of private (e.g., leased) and/or public communication channels. These may include, for example, Digital Signal ("DS") channels (e.g., DS-3/T-3, DS-1/T1), Synchronous Optical Network ("SONET") channels (e.g., OC-3/STS-3), Integrated Services Digital Network ("ISDN") channels, Digital Subscriber Line ("DSL") channels, cable modem channels and a variety of wireless communication channels including satellite broadcast and cellular channels.

In addition, various networking protocols may be used to support communication across the network 120 including, for example, the Asynchronous Transfer Mode ("ATM"), Ethernet, and Token Ring (at the datalink level); as well as Transmission Control Protocol/Internet Protocol ("TCP/IP"), Internetwork Packet Exchange ("IPX"), AppleTalk and DECnet (at the network/transport level). It should be noted, however, that the principles of the invention are not limited to any particular communication channel or protocol.

The portal server 110 in one embodiment includes a user database for storing various types of user configuration and account data. Users may register and login to the portal server 110 from a client 140 by specifying a user ID and/or password. According to one embodiment, a user connects to the servers 110, 130 via a browser application such as Netscape Navigators™ or Microsoft Internet Explorer™ which communicates via the Hypertext Transfer Protocol (hereinafter "HTTP").

In one embodiment, users may configure the portal server 110 to retrieve and manage specific types of information. For example, a user may configure the portal server 110 to retrieve up-to-date stock quotes for a specified set of stocks (e.g., reflecting the user's portfolio), to collect the weather forecast for the user's hometown, and/or to retrieve recent articles relating to a particular sports franchise. The portal server will then retrieve the specified information from other servers (e.g., server 130) on behalf of the user.

In addition to information retrieval and management, in one embodiment the portal server 110 also provides application services such as email, online scheduling (e.g., appointments, to-do lists, etc), instant messaging, contact management, word processing and a variety of other online services. Users may access these services by logging in to the portal server 110 with a valid user ID and password. In one embodiment, the portal server 110 generates a unique, personalized Web page for each user containing links to all, or a subset of, the information and/or services subscribed to by the user.

EMBODIMENTS OF THE INVENTION

Figure 2:
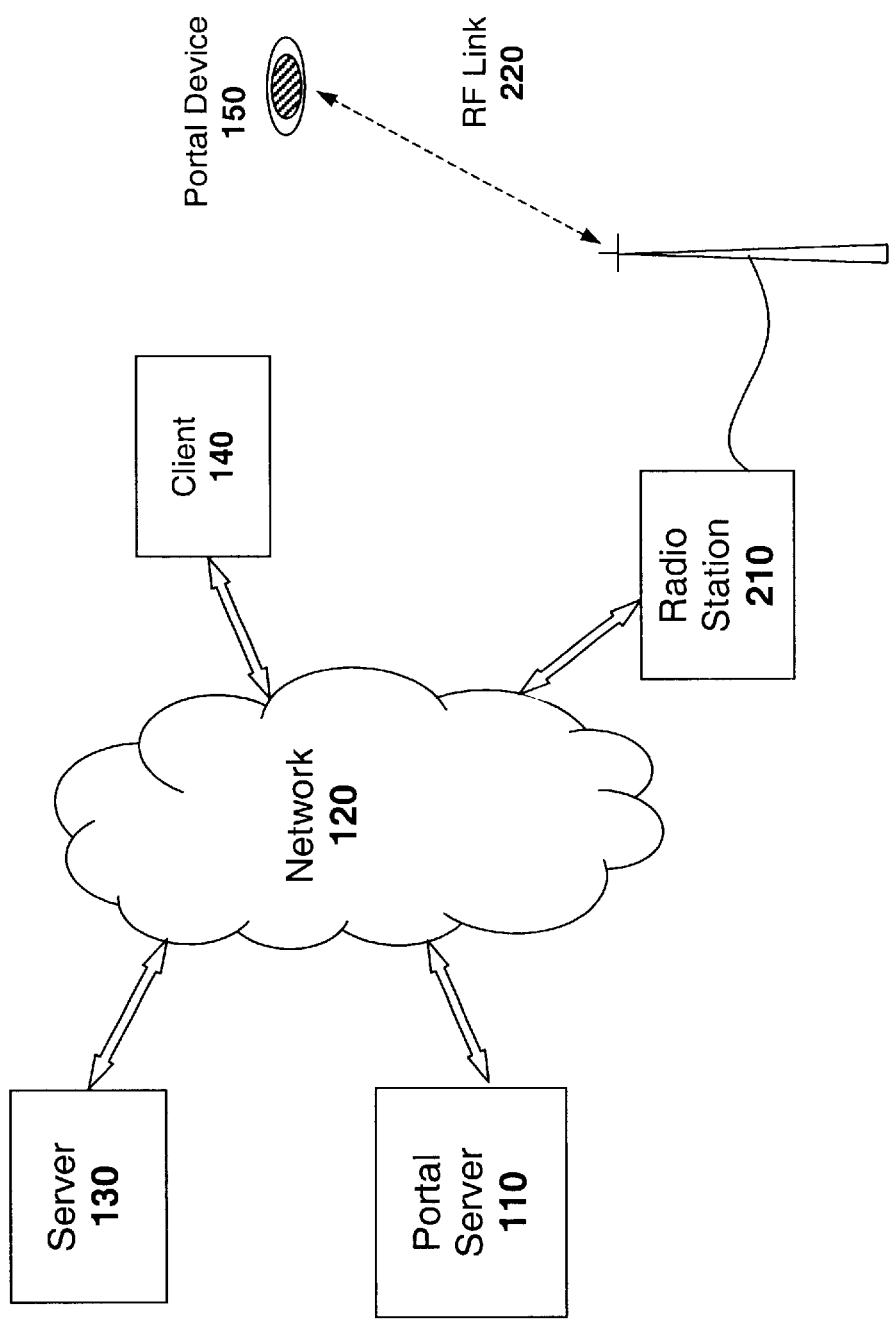
FIG. 2 illustrates another exemplary network architecture used to implement elements of the present invention.

In one embodiment, a portal device 150 stores and processes user-specified information and/or programs as well as non-user-specified information/programs (e.g., targeted advertisements based on the user's profile). The information/programs may be transmitted to the portal device 150 through the client 140, and/or directly via wireless broadcast (as illustrated in FIG. 2 and described in detail below). Thus, the portal device 150 in this embodiment is a removable extension of the portal server 110, storing a subset of the information and services maintained by the portal server 110 on behalf of the user. For example, a user may configure the portal server 110 to periodically download the user's to-do list (or other scheduling data) to the portal device (e.g., every morning, every two hours, every time the user connects the portal device to the client 140, etc). When the user leaves the office, he/she can simply take the portal device with him/her and view his/her schedule throughout the day.

The timing of the information/program download may depend on the particular embodiment of the portal device 150. For example, if a wireless embodiment is used (described below) downloads may occur at any time when the portal device 150 is within wireless transmission range, whereas if a non-wireless embodiment is used, downloads may be limited to periods of time when the portal device 150 is connected to the portal server 110.

In one embodiment, the user may customize the portal device 150 preferences and content which will be downloaded to the portal device 150 from the portal server 110. This may be accomplished, for example, by selecting certain preferences/content from a portal server 110 Web page (e.g., by using an online programming interface as described below). For example, the user may choose to have each day's to-do list downloaded to his portal device 150 and may also program the device 150 (e.g., via the portal server 110) to continually display the next scheduled event for the day. Various other user interface and content-based data may be transmitted to the portal device 150 from the portal server 110 while still complying with the underlying principles of the invention.

Client Link

As illustrated in FIG. 1, one embodiment of the portal device 150 communicates to the portal server 110 via a communication link 160 with the client 140. The communication link may be established via a physical I/O connection with the client 140 such as a Universal Serial Bus ("USB") interface or a communication ("serial") interface. Alternatively, the communication link 160 may be a wireless link such as an Infrared I/O channel or a radio frequency ("RF") I/O channel.

In one particular embodiment, the client link 160 is formed using a capacitively-coupled communication channel. As is known in the art, a capacitor is any dielectric sandwiched between two conductive elements. In this embodiment, one of the two conductive elements is located within the portal device 150 and the second of the two conductive elements is located external to the portal device 150 and is communicatively coupled to an I/O port of the client 140. For example, in one embodiment, the second conductive element may be disposed within user's mouse pad. According to this embodiment, the user may simply place the portal device on the mouse pad to set up the capacitive communication link 160 with the client 140. It should be noted, however, that various other client links 160 may be employed while still complying with the underlying principles of the invention.

Direct Radio Broadcast

In one embodiment, illustrated in FIG. 2, data and/or programs are transmitted to the portal device 150 from the portal server 110 over an RF link 220. In this embodiment, the organization maintaining the portal server 110 and/or implementing other features of the system and method described herein (hereinafter the "portal organization" or "PO"), may lease a portion of the RF transmission bandwidth from one or more radio stations 210. It should be noted, however, that various RF transmission techniques may be used without departing from the underlying principles of the invention.

Figure 3:
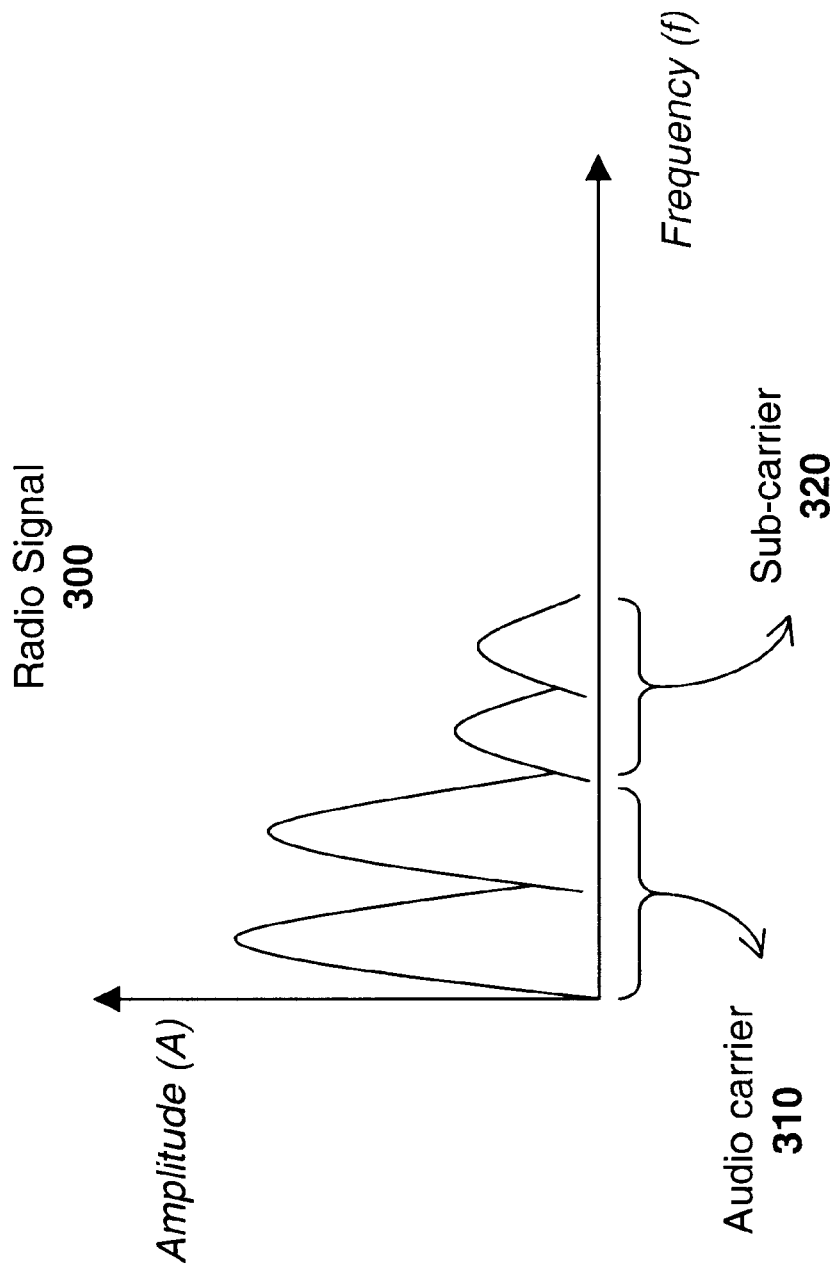
FIG. 3 illustrates a radio signal including its sub-carrier in the frequency domain.

Referring to FIG. 3, in one particular embodiment, the PO will use the radio station's sub-carrier frequency band 320 to transmit data and/or programs to the portal device 150. As it is known in the art, radio stations are licensed a sub-carrier frequency block 320 along with the audio carrier frequency block 310. Although some radio stations use the sub-carrier frequency block 320 (e.g., for foreign-language broadcast), most do not. As such, the present embodiment provides a mechanism for transmitting data over an infrequently-used wireless transmission channel.

To further conserve bandwidth within the sub-carrier frequency block 320, in one embodiment, the data transmitted over the RF link 220 is not addressed to any one specific portal device. Rather, in this embodiment, the data is simply transmitted (e.g., with a tag that identifies the data) and is sensed by any portal device(s) 150 listening within the sub-carrier block 320. This type of addressing will be referred to herein as "data addressable" addressing (in contrast to "device addressable addressing in which a device address is associated with the transmitted data). The individual portal devices 150 that sense the various data transmissions may ignore them or may take some other specified action (e.g., store and display the transmitted data), depending on how the devices 150 are configured. For example, a portal device 150 may be configured by a user to track stock quotes for stocks within his/her portfolio and to ignore all other stock quotes. Similarly, the user may configure the portal device 150 to listen for local weather reports, local news headlines, and/or any other information which may be accessed by the user directly at the portal server 110.

In one embodiment, the data broadcast in a particular geographical region will be selected based on the number of users in that region who have registered on the portal server 110 and/or the types of data requested by users in the region. For example, if no users in the region have configured the portal server 110 to gather a particular stock quote, then the portal server 110 will not transmit that stock quote over the RF link 220 in that region. Similarly, the portal server 110 may be configured to only transmit local data such as weather and local news in the local broadcast region to which the weather and news pertains (i.e., where it will most likely be requested). Broadcasting data selectively in this manner will further improve bandwidth over the RF link 220 (i.e., by reducing unnecessary data transmissions).

In one embodiment, portal devices 150 may be addressed directly (e.g., by including the device's serial number or other ID code in an address field of the data transmission). This embodiment may be provided by the PO to users as a "premium" service, under which the user pays an additional fee to receive personally-addressed information over the sub-carrier 360 (e.g., email messages, daily schedules, etc), as well as the more general information described above.

Users of this embodiment may be charged on a subscription basis and/or on a per-use basis, depending on the embodiment. Of course, other pricing models may be employed while still complying with the underlying concept. The PO may also employ this embodiment under certain emergency situations (e.g., where it is crucial that a particular user receive a data transmission immediately).

Embodiments of the Portal Device

Figure 4:
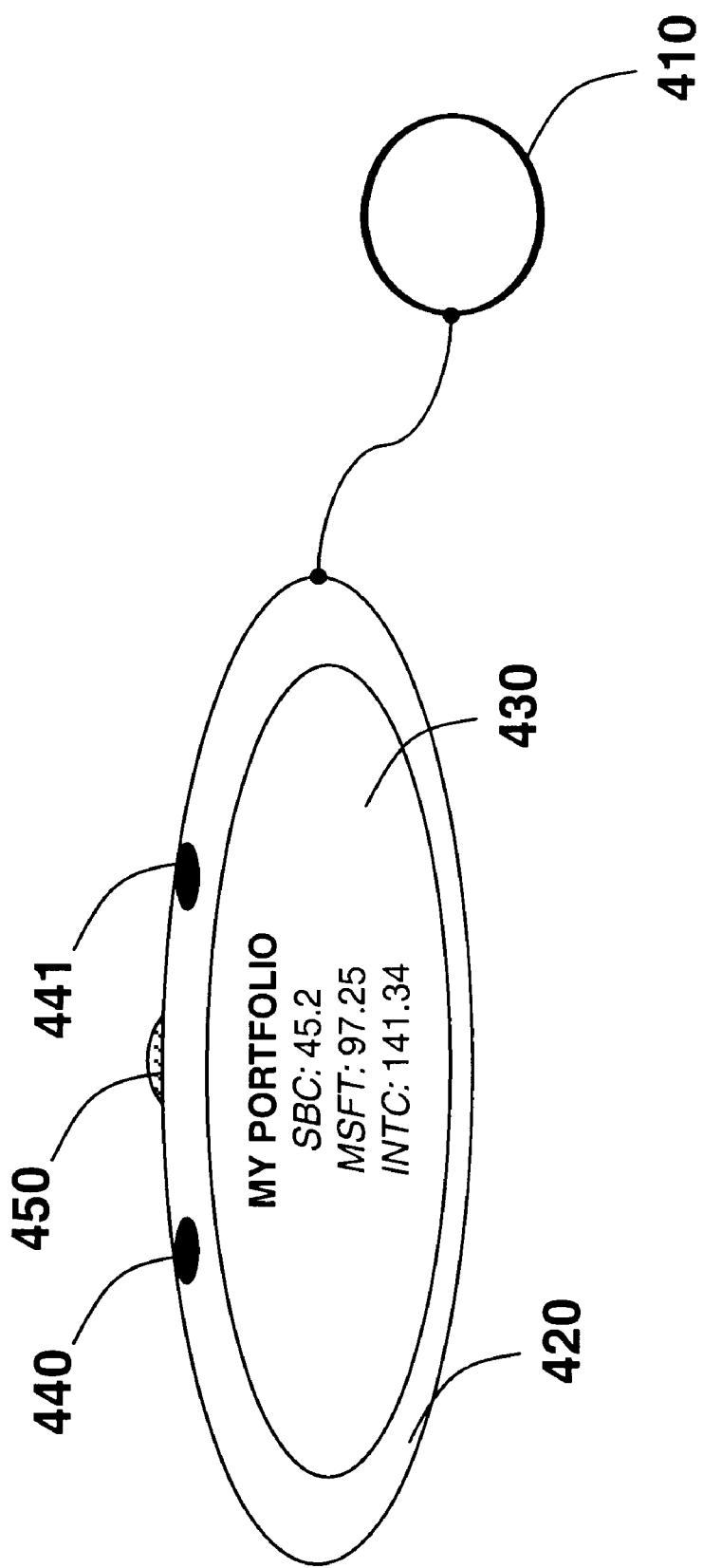
FIG. 4 illustrates an external view of a portal device according to one embodiment of the invention.

FIG. 4 illustrates an external view of one embodiment of a portal device 420 which may be used as a key chain. As shown, this embodiment includes a is key chain ring 410 for securing a set of keys (or other personal effects) to the device 420. Also illustrated is a display 430 for displaying various types of portal data. In one embodiment the display is a Liquid Crystal Display ("LCD"). Of course, other display technologies may be implemented while still complying with the underlying principles of the invention (e.g., Light Emitting Diode ("LED") displays). Also included is a set of control buttons 440 and 441 for selecting menu items and/or jumping back and forth between stored portal data and a control knob 450 for scrolling between menu items and/or data. In one embodiment, the control knob 450 rotates on an axis which is substantially perpendicular to the plane of the display 430.

Additional attachable embodiments of the portal device 150 include a necklace configuration, a pocket watch configuration, and a sports configuration (e.g., wherein the portal device is strapped firmly around a user's arm). In the latter configuration, the shell of the portal device may be comprised of a waterproof material to avoid water damage to the internal components of the device.

Figure 5:
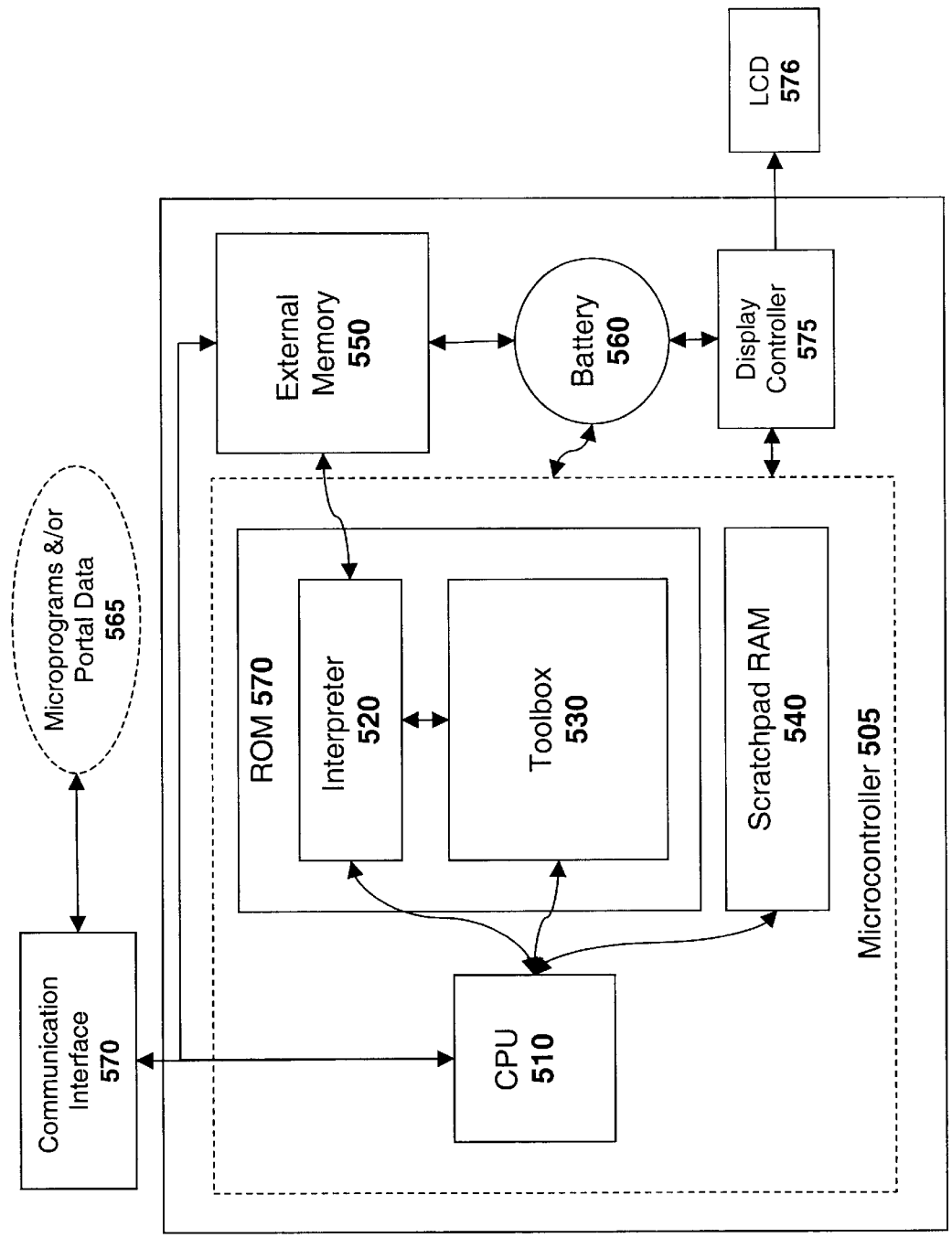
FIG. 5 illustrates an internal view of a portal device according to one embodiment of the invention.

As illustrated in FIG. 5, one embodiment of the portal device 150 is comprised generally of a microcontroller 505, an external memory 550, a display controller 575, and a battery 560. The external memory 550 may be used to store programs and/or portal data 565 transmitted to the portal device 150 from the portal server 110 (e.g., via client 140 and/or radio station 210). In one embodiment, the external memory 550 is non-volatile memory (e.g., an electrically erasable programmable read only memory ("EEPROM"); a programmable read only memory ("PROM"), etc). Alternatively, the memory 550 may be a volatile memory (e.g., random access memory or "RAM") but the data stored therein may be continually maintained via the battery 560. The battery 560 in one embodiment is a coin cell battery (e.g., of the same type used in portable electronic devices such as calculators and watches). In one embodiment, when the battery power decreases below a threshold level, the portal device 150 will notify the user and/or the portal server 110. The portal server 110 in one embodiment will then automatically send the user a new battery.

The microcontroller 505 of one embodiment is comprised of a central processing unit ("CPU") 510, a read only memory ("ROM") 570, and a scratchpad RAM 540. The ROM 570 is further comprised of an interpreter module 520 and a toolbox module 530.

The toolbox module 530 of the ROM 570 contains a set of toolbox routines for processing data, text and graphics on the portal device 150. These routines include drawing text and graphics on the portal device's display 430, decompressing data transmitted from the portal server 110, reproducing audio on the portal device 150, and performing various input/output and communication functions (e.g., transmitting/receiving data over the client link 160 and/or the RF link 220). A variety of additional portal device functions may be included within the toolbox 530 while still complying with the underlying principles of the invention.

In one embodiment, microprograms and portal data 560 are transmitted from the portal server 110 to the external memory 550 of the portal device via a communication interface 570 under control of the CPU 510. Various communication interfaces 570 may be employed without departing from the underlying principles of the invention including, for example, a Universal Serial Bus ("USB") interface or a serial communication ("serial") interface. The microprograms in one embodiment are comprised of compact, interpreted instructions known as "bytecodes," which are converted into native code by the interpreter module 520 before being executed by the CPU 510. One of the benefits of this configuration is that when the microcontroller/CPU portion of the portal device 150 is upgraded (e.g., to a faster and/or less expensive model), only the interpreter module 520 and toolbox 530 of the ROM needs to be rewritten to interpret the currently existing bytecodes for the new microcontroller/CPU. In addition, this configuration allows portal devices 150 with different CPUs to coexist and execute the same microprograms. Moreover, programming frequently-used routines in the ROM toolbox module 530 reduces the size of microprograms stored in the external memory 550, thereby conserving memory and bandwidth over the client link 160 and/or the RF link 220. In one embodiment, new interpreter modules 520 and/or toolbox routines 530 may be developed to execute the same microprograms on cellular phones, personal information managers ("PIMs"), or any other device with a CPU and memory.

One embodiment of the ROM 570 may be comprised of interpreted code as well as native code written specifically for the microcontroller CPU 505. More particularly, some toolbox routines may be written as interpreted code (as indicated by the arrow between the toolbox 530 and the interpreter module 520) to conserve memory and bandwidth for the same reasons described above with respect to microprograms. Moreover, in one embodiment, data and microprograms stored in external memory 550 may be configured to override older versions of data/microprograms stored in the ROM 570 (e.g., in the ROM toolbox 530).

Data Compression

As described above, microprograms and portal data may be transmitted to the portal device 150 in a compressed format. As such, in one embodiment, decompression logic is programmed into the microcontroller ROM 570 (e.g., within the toolbox 530) and is used to interpret and/or decompress the microprograms/data as they are received.

In one embodiment, a plurality of uncompressed data is stored in the ROM 570, and codes identifying the uncompressed data are transmitted across the RF link 220 and/or client link 160. For example, instead of transmitting the entire market code for a particular stock, such as "MSFT" for Microsoft, a compressed code, e.g., "M," may be transmitted to the portal device 150 instead. The ROM 570 in this embodiment may include a lookup table (or similar decode logic) for retrieving the real market code "MSFT," using the compressed code, "M." Once the real code is retrieved from the ROM 570, it may be displayed on the portal device 150 as illustrated in FIG. 4. It should be noted, however, that the underlying principles of the invention may be practiced using a variety of coding schemes and/or digital compression techniques.

User Registration and Authentication

Figure 6:
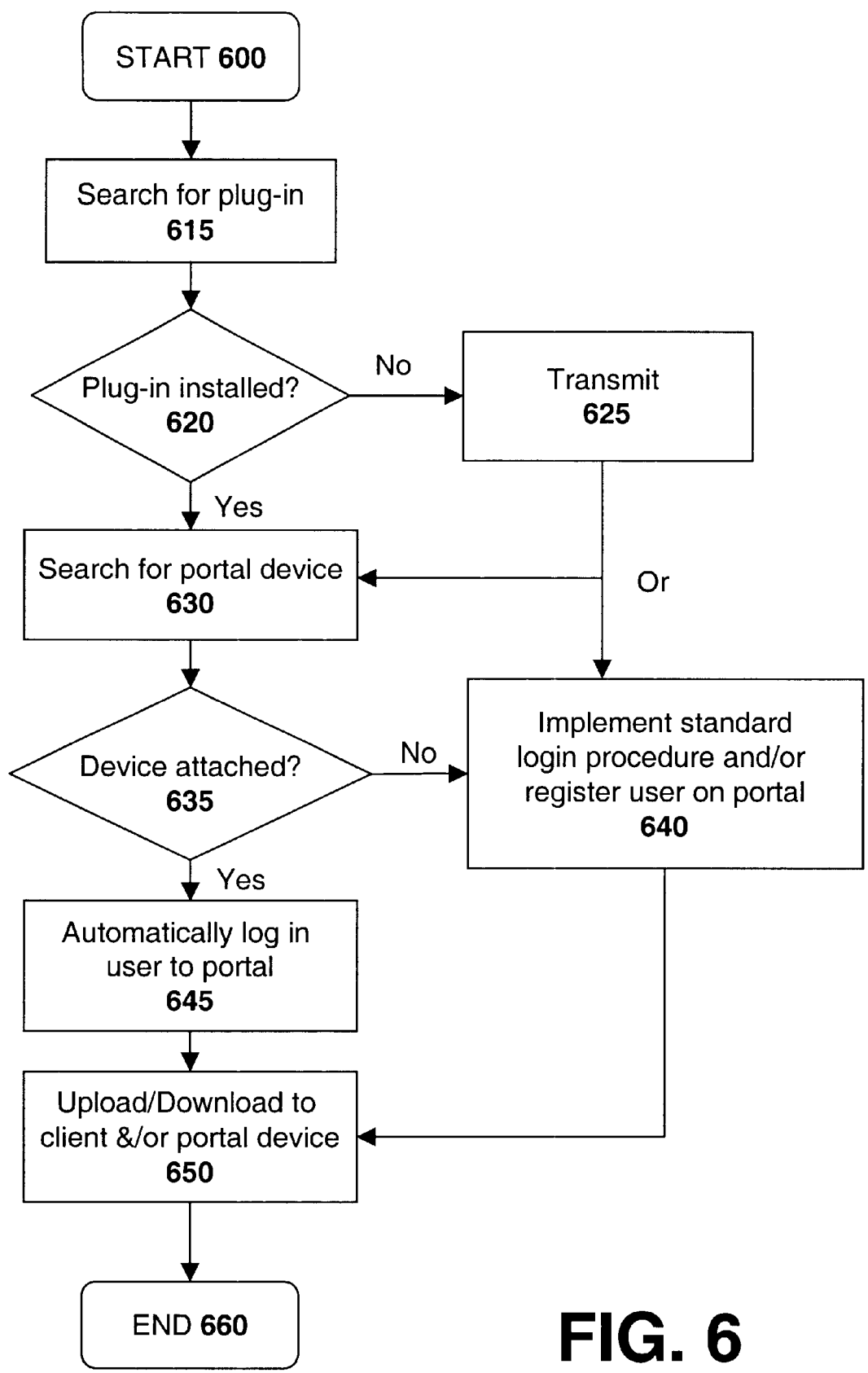
FIG. 6 illustrates a process according to one embodiment of the invention wherein a user is logged in to a portal server.

One embodiment of the invention will now be described with reference to the flowchart of FIG. 6. According to this embodiment, when a user initially connects to the portal server 110 (e.g., from client 140), the portal server 110 will determine whether a portal device plug-in is installed on the user's Web browser (at 615). As is known in the art, plug-ins are auxiliary programs added to Web browsers to provide them with new levels of functionality. One embodiment of the present invention uses a plug-in to coordinate communication between the portal server 110, the client 140, and the portal device 150. In addition, the plugin may convert and/or compress "standard" portal programs/data (e.g., programs/data meant to be executed on the client 140) into microprograms/data that the portal device can properly interpret, as described herein. If the plug-in is not installed, the portal server 110 may automatically transmit and install it on the client 140 (at 625).

At 630, the portal server 110 (e.g., via the plug-in) determines whether the portal device is currently attached to the client 140. If the device 150 is attached then, in one embodiment, the portal server 110 will automatically log the user in. The portal server 110 may automatically authenticate the portal device 150 via a serial number and/or a user authentication key embedded/stored in the device 150. Once the user is logged in to the portal server, he/she can then transmit data to and from the portal device 150 as described herein.

If the device 150 is not attached, however, then the portal server 110 may implement a standard user name/password login procedure and/or may register the user (at 640). During the registration process the user may be asked to respond to a series of questions relating to his/her background (e.g., hobbies, education, career, etc). The portal server 110 may use this information to personalize the content collected and provided to the user and/or to target ads to the user based on the user's preferences. In addition, at this point the user may be provided with an opportunity to configure the portal server 110 to gather and manage specific information on behalf of the user (e.g., particular stocks, sports scores, news, etc) and/or to provide the user with access to certain online applications (e.g., email, electronic scheduling, etc) as described herein.

Online Programming Interface

Figure 7:
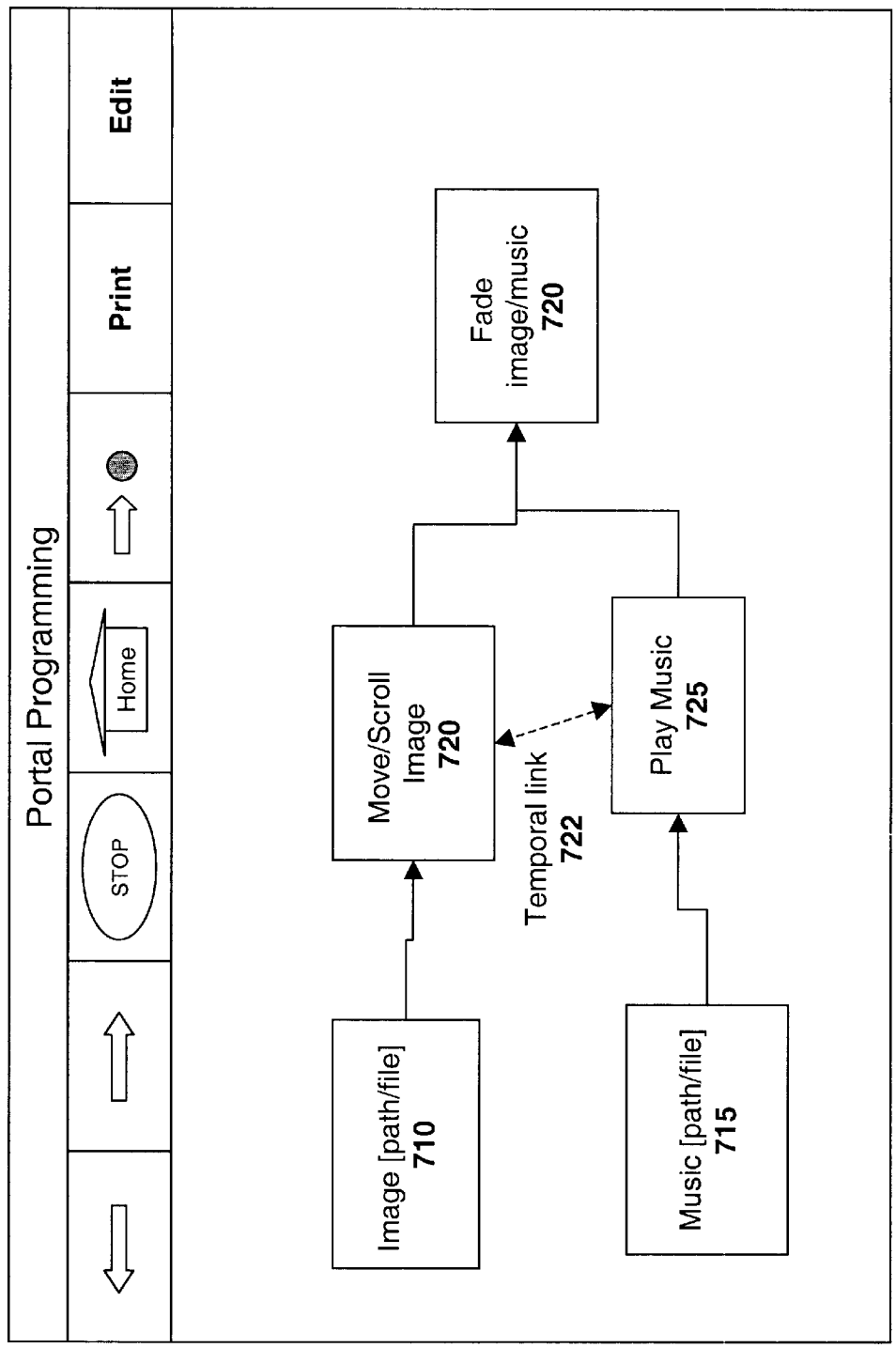
FIG. 7 illustrates a visual programming interface according to one embodiment of the invention.

In one embodiment, registered users are provided with an online visual programming interface such as that illustrated in FIG. 7. Under this embodiment users may construct their own microprograms to be executed on the portal device 150 and/or the client 140. For example, a user may define a programming block as a hyperlink which points to a particular piece of data or series of data (e.g., a current stock quote for AT&T, the San Francisco weather forecast, etc) and may also indicate how frequently the data associated with the hyperlink is to be updated. Multiple such blocks may be chained together to create a continual sequence of information to be displayed on the portal device 150 or the client 140. The particular programs generated by users may depend on whether a wireless portal device 150 is being used. For example, a microprogram designed to download up-to-date stock quotes may require a wireless connection to the portal server 110 to be effective.

As illustrated in FIG. 7, users may also program animation and/or sound into the portal device 150. For example, block 710 points to a particular image file (e.g., a bitmap file) and block 715 points to a particular music file (e.g., a Musical Instrument Digital Interface or "MIDI" file). The user may cause the image to move across the display 430 of the portal device 150 in a specified direction by programming block 720 (e.g., using X and Y coordinate data). Concurrently, the user may program block 725 to play the music track identified in block 715. Temporal link 722 indicates that the movement of the image and the playback of the music track are to take place simultaneously. Programming block 720 indicates that the music and image will both fade out to end the program.

In one embodiment, standard image and/or music files stored on the client 140 are converted to a format which the portal device can interpret (e.g., using a conversion module which may included in the client plug-in). For example, the melody line may be extracted from a MIDI file and transmitted to the portal device as a series of notes. Similarly, bitmap or JPEG images may be converted so that they are properly displayed on the portal device display 430, which in one embodiment is a black & white LCD display.

Portal Key Operations

In one embodiment, each portal device 150 includes a portal key which uniquely identifies the device, the user and/or particular data on the portal server. The key may either be permanently embedded in the device (e.g., the key may be the serial number) or, alternatively, may be selected manually by the user (e.g., the user's ID on the portal server 110) or may be assigned to the device by the portal server 110.

Figure 8:
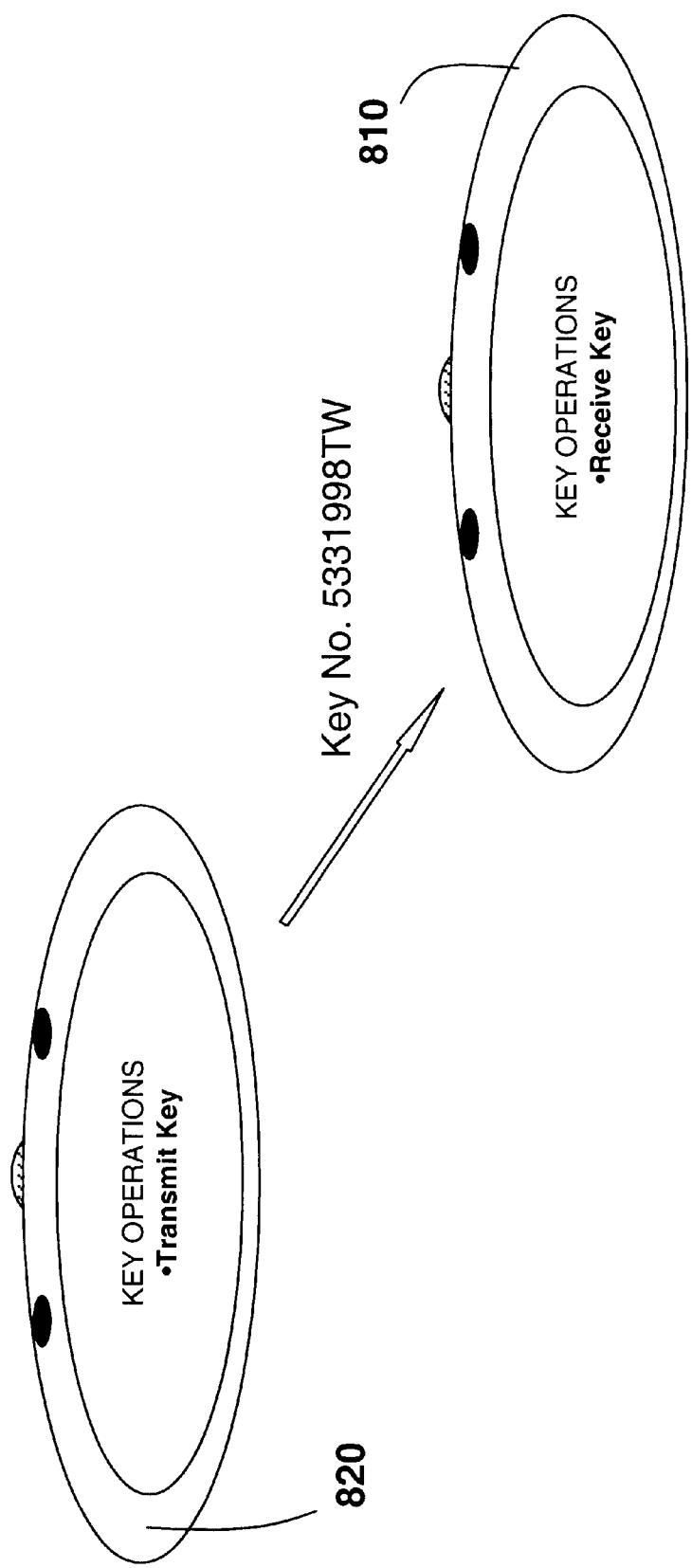
FIG. 8 illustrates portal device communication according to one embodiment of the invention.

Regardless of how the portal key is generated, as illustrated in FIG. 8, in one embodiment users may exchange keys between portal devices. Specifically, portal device 810 is shown receiving a portal key (key no. 5331998TW) from portal device 820. In one embodiment, when the user of portal device 810 connects to the portal server 110 after receiving the portal key, he/she will be provided with access to information and/or services associated with the portal key. For example, the user of portal key 820 may store personal and/or business-related information on the portal server 110 which he/she wants to share with the user of portal device 810.

Several portal key applications may be implemented using this type of portal key exchange. These include, for example, social invitations; "business card" exchanges (i.e., where the user of portal device 820 stores an online business card on portal server 110); personal photo exchanges; and/or exchanges of any other information adapted to be stored on a computer network. It should be noted, however, that the underlying principles of the invention are not limited to any particular type of informational exchange.

Exchanging portal keys in the foregoing manner provides an efficient mechanism for exchanging information using a limited amount of portal device memory because the underlying information is stored on the portal server 110, rather than the portal device 150 itself. In addition, when a user exchanges a key, the user is then free to continually update the information/services on the portal server 110 to which the key provides access. For example, a user may exchange a key with a prospective employer, and subsequently update his/her resume on the portal server 110. Similarly, if the user is involved in research, he/she may exchange his/her key with colleagues and continually update the research data on the portal server 110.

In one embodiment, a user may set up a number of different keys on the portal server, each pointing to a different type of information and/or service. The user can then select a particular key to transmit to a second user (e.g., using the portal device controls 440, 441, 450) depending on the information and/or service to be provided to the second user. For example, a user may establish a business key which points to business-oriented information/services (e.g., a firm brochure) and a personal key which points to personal information/services (e.g., personal photos). In one embodiment, the portal device 150 will include one standard key for generally identifying the portal device 150 to the portal server 110 and other users, and any number of user-defined "sub-keys" which can be used to exchanged more specific user data (e.g., such as the business data and personal data described above).

Various advertising and promotional services may be implemented in accordance with the underlying principles of the invention. In one embodiment, portal devices may be set up to broadcast keys to users at a place of business such as a supermarket or a car dealership. A user may choose to receive the key on his/her portal device and thereby acquire additional information about the product/service associated with the key when he/she logs in to the portal server 110. Businesses may offer various types of Internet promotions/discounts to users in this manner. Conversely, a user may choose to transmit his/her key to a portal device located at a business to request that the business automatically contact the user with additional product/service information (e.g., via email, a telephone call, etc).

In one embodiment, advertisements and/or coupons may be transmitted to the user's portal device 150. This may be accomplished over the client link 160 and/or the RF link 220. If transmitted over the client link 160, the ad/coupon may be programmed to trigger at a statistically effective time (one embodiment of the portal device 150 includes a digital clock). For example, a Starbucks ® Coffee ad may be downloaded to the portal device 150 at a random time and may be programmed to trigger in the morning, before the user heads in to work. Personal information known about the user (e.g., the user's preferences, the user's daily schedule, etc) may be factored in to the timing decision and/or the decision as to which ads to transmit to the user. The ad/coupon may also be triggered automatically at any time/date via the RF link 220.

If a coupon is transmitted, the user may redeem the coupon in a number of ways. In one embodiment, the user may simply show the coupon code to an employee working at the business for which the coupon is valid. Alternatively, a portal device may be configured directly at the business to automatically redeem coupons (e.g., via a coupon exchange feature similar to the key exchange feature described above). The business' portal device may communicate with the portal server 110 to continually transmit and receive coupon data. In one embodiment, the user's portal device is configured to display a bar code identifying the received coupon/service which may be interpreted by a bar code device at the business to redeem the coupon/service. The underlying principles of the invention may be implemented using various additional advertisement and/or coupon redemption mechanisms.

In one embodiment, a coupon or advertisement may be transmitted to the user's portal device 150 from a portal device located at a business (in contrast to the embodiment above, where the coupon/advertisement is transmitted by the portal server 110). In this embodiment, the user's portal device 150 may automatically trigger the advertisement/coupon when it is brought within range of the business' portal device. In one embodiment, the business' portal device transmits a key to the user's portal device 150, which the user may subsequently use to obtain additional information from the portal server 110 (e.g., relating to a particular product or service). In this embodiment, the business' portal device may or may not communicate directly with the portal server 110.

It should be noted that the foregoing description of portal devices and associated methods includes various business methods. In addition, according to one particular business method, once a user registers on the portal server 110, the PO will assign a portal device 150 to the user free of charge (or for some nominal fee). Upon receipt of the portal device 150 (e.g., in the mail), the user will attach the portal device (e.g., via the client link 160), and register the portal device 150 with the portal server 110. The user may then configure the manner in which he/she will use the portal device 150 (e.g., by selecting the types of portal data/microprograms to be processed and stored in the device). In one embodiment, users will be given the option to upgrade to a more advanced portal device 150 for a specified fee. In one embodiment, however, the fee will be no more than the cost of manufacturing and shipping the device to the user.

In one embodiment, the portal device 150 is shipped to the user with pre-configured data and/or advertisements already stored within the device 150. This may include, for example, the user's name and address; scheduling data for the user for the day/week on which the user will receive the device; and/or any other data stored by the user on the portal server 110.

In one particular embodiment, the portal device 150 is configured to display shipping information (e.g., the shipping bar code and/or destination address) on its display 430. This shipping information may be used by the shipping company to transport the portal device 150 to the user. This embodiment may be shipped to the user using transparent packaging so that the shipping data may be easily read/scanned.

Additional Embodiments

As mentioned above, the portal device 150 may communicate with the portal server 110 using various RF communication techniques. For example, in one particular embodiment, the portal device 150 transmits and receives data to/from a cellular network via the cellular digital packet data ("CDPD") standard. As it is known in the art, the CDPD standard is a digital wireless standard that is deployed as an enhancement to the existing analog cellular network. It provides a packet overlay onto the AMPS network and moves data at 19.2 Kbps over continuously-changing unused intervals in standard voice channels. Accordingly, this embodiment of the portal device is capable of exploiting normally unused bandwidth on a nation-wide, analog cellular network. Embodiments of the portal device may also be configured to transmit/receive data using a variety of other communication standards including 2-way paging standards and third generation ("3G") wireless standards (e.g., UTMS, CDMA 2000, NTT DoCoMo, . . . etc).

Figure 9:
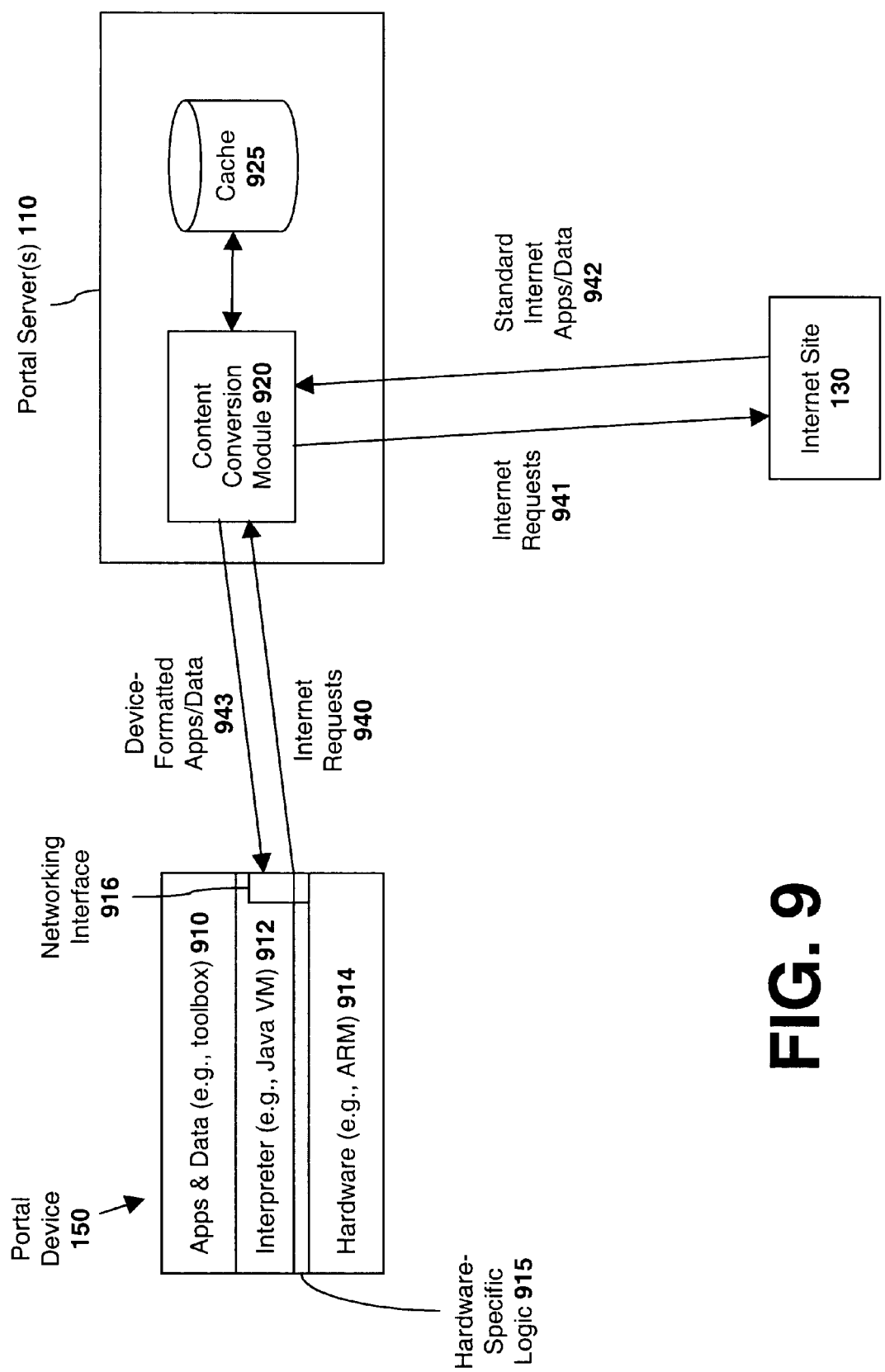
FIG. 9 illustrates one embodiment of a portal device communicating with a portal server.

As described above, because certain embodiments of the portal device 150 are configured to process hardware-independent interpreted code (e.g., via an interpreter module 520 such as a Java virtual machine), applications may be ported to new hardware platforms without significant changes. In addition, as illustrated in FIG. 9, in one embodiment, communications functionality is provided via a modular networking interface 916, which may be easily modified/replaced without altering existing portal device applications 910 or significant portions of the bytecode interpreter 912. For example, when changing from a CDPD network to a 3G network, only the network interface component 916 of the VM interpreter 912 will need to be updated (along with any required 3G hardware 914) to support the new 3G protocol.

As described above (and as indicated in FIG. 9), in one embodiment, the interpreter module 912 on the portal device 150 is a Java virtual machine. As such, this embodiment of the portal device 150 is capable of executing a vast library of existing hardware-independent Java applications (e.g., applets/bytecodes) 910. Moreover, as indicated in FIG. 9, one embodiment of the portal device employs a 32-bit RISC-based microprocessor such as an ARM processor. As is known in the art, ARM processors are widely used in PDAs, cell phones and a variety of other wireless devices. It should be noted, however, that various other hardware and software (and/or firmware) architectures may be used for the portal device 150 while still complying with the underlying principles of the invention.

As described above, one embodiment of the portal server 110 converts standard applications and data into a format which the portal device 150 can properly interpret. Accordingly, as illustrated in FIG. 9, this embodiment of the portal server 110 may include a content conversion module 920 for processing portal device 150 requests for Internet content 940. More particularly, in one embodiment, the portal server 110 acts as a proxy for the portal device 150, forwarding Internet requests 940, 941 to the appropriate Internet site 130 on behalf of the portal device 150, receiving responses from the Internet site 130 in a standard Internet format (e.g., Web pages with embedded audio/video and graphical content), and converting the standard Internet responses 924 into a format which the portal device 150 can process (e.g., bytecodes).

For example, the conversion module 920 may include a hypertext markup language ("HTML") rendering module (not shown) for interpreting HTML code and downloading any embedded content in the HTML code (e.g., graphics, video, sound, . . . etc) to the portal server 110. The conversion module 920 may then combine the HTML code and embedded content and generate a set of bytecodes for accurately reproducing the requested content on the portal device 150. As described above, in one embodiment, the bytecodes may be Java bytecodes/applets. However, various other types of interpreted and/or non-interpreted code may be generated, depending on the particular type of portal device 150 being used (e.g., one with an interpreter module or one without).

Because the portal server 110 has an intimate knowledge of the capabilities/configuration of each portal device 150 (e.g., screen size, graphics/audio capabilities, available memory, processing power, user preferences, . . . etc) it can reconstruct the requested Internet content accurately, while at the same time minimizing the bandwidth required to transmit the content to the device 150. For example, the conversion module 920 may perform pre-scaling and color depth adjustments to the requested content so that it will be rendered properly within the portal device 150 display. In making these calculations, the conversion may factor in the memory and processing power available on the portal device 150. In addition, the conversion module 920 may compress the requested content using a variety of compression techniques (and thereby preserve network bandwidth).

In one embodiment, the conversion module 920 will simply discard Internet content which either cannot be reproduced on the portal device 150, or which the user has indicated that he/she does not want to be reproduced on the portal device. For example, a user may indicate that he/she does not want sounds to be generated on the portal device 150 or that he/she does not want advertisements transmitted to the portal device 150. The conversion module 920 will then remove any sounds or advertisements embedded in the requested Web page (or other requested Internet content). Because HTML rendering and other advanced processing of Internet content/data is offloaded to the portal server 110 as described above, the portal device 150 can be manufactured using a low power microprocessor or microcontroller, thereby lowering the cost of manufacture and/or the energy consumed by the device 150.

In one embodiment, when a particular Web page or other Internet object has been converted into a format suitable for execution on the portal device 150 (e.g., Java bytecodes and data) the formatted page/object may be stored locally on a cache 925 at the portal server 110 (or other server maintained by the PO). Thus, the next time the content is requested, the conversion module 920 may simply read the previously-generated code from the local cache 925 (i.e., it will no longer need to retrieve the content from remote locations to reconstruct the code).

Various caching techniques and algorithms may be implemented to ensure that the cache 925 is storing Internet data efficiently (i.e., resulting in an acceptable percentage of cache 'hits') and that the data is current. For example, the portal server 110 may cache the most frequently-requested Internet data (e.g., the Yahoo™ home page), and may remove content from the cache based on a least-recently used caching policy. In addition, to ensure that data stored in the cache is current, the portal server 110 may compare the version of the data stored in the cache 925 with the version of data stored at the remote Internet site 130 when the data is requested. Similarly, the portal server 110 may store data in the cache 925 for some predetermined period of time before checking the remote server 130 for a new version. Various other Internet caching techniques may be employed while still complying with the underlying principles of the invention (e.g., those defined in the Internet Caching Protocol ("ICP") and/or the Cache Array Routing Protocol ("CARP")).

Location-Based Messaging

Figure 10:
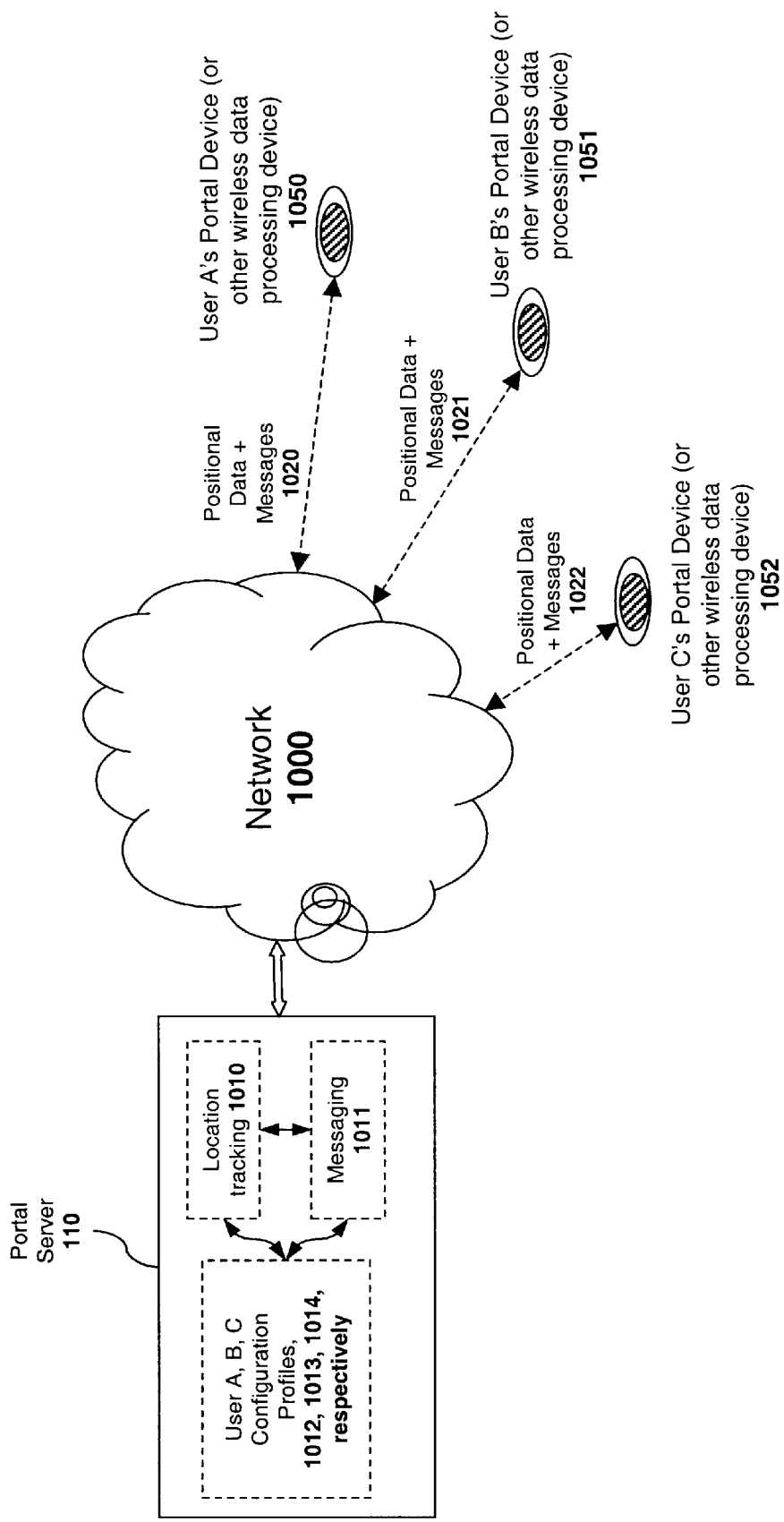
FIG. 10 illustrates an embodiment of the invention which employs location-based instant messaging.

Referring to FIG. 10, in one embodiment of the invention, a location tracking module 1010 executed on the portal server 110 will monitor the location of each portal device/user 1050–1052 on the system and transmit the portal device/user location 1020–1022. respectively, in response to certain specified events. For example, "User A" may configure his/her portal device 1050 and/or the portal server 110 to transmit positional data whenever User A sends a message to other users. User A may also specify a subset of users who should receive positional data when User A transmits a message (e.g., via a "buddy list"). Moreover, User A may specify the types of positional data that users within the subset should receive. For example, User A may specify that "User B" should only receive a measurement of the distance between User A and User B; whereas User C should receive User A's precise location (e.g., 156 University Aye, Palo Alto, Calif.).

User A's preferences with respect to location tracking may be stored in User A's configuration profile 1012 on the portal server 110. Subsequently, when User A transmits a message (via messaging module 1011), the location tracking module 1010 will read User A's specifications from User A's configuration profile 1012 to determine how to format User A's positional data for transmission to User B and/or User C. It should be noted, however, that User A's location may be tracked/transmitted using various levels of precision while still complying with the underlying principles of the invention (e.g., by city, zip code, area code, longitude and latitude, . . . etc).

The location of each portal device 1050–1052 may be captured using various types of positional technology. For example, certain portal devices may employ global positioning system ("GPS") techniques for identifying the portal device's location (e.g., using GPS satellites). If the portal devices 1050–1052 communicate via a cellular or PCS communications network, the cell from which the user transmits his/her message may be used by the location tracking module 1010 to identify the user's portal device's location. Various other known positional tracking technologies may be employed while still complying with the underlying principles of the invention (e.g., wireless triangulation techniques).

Figure 11:
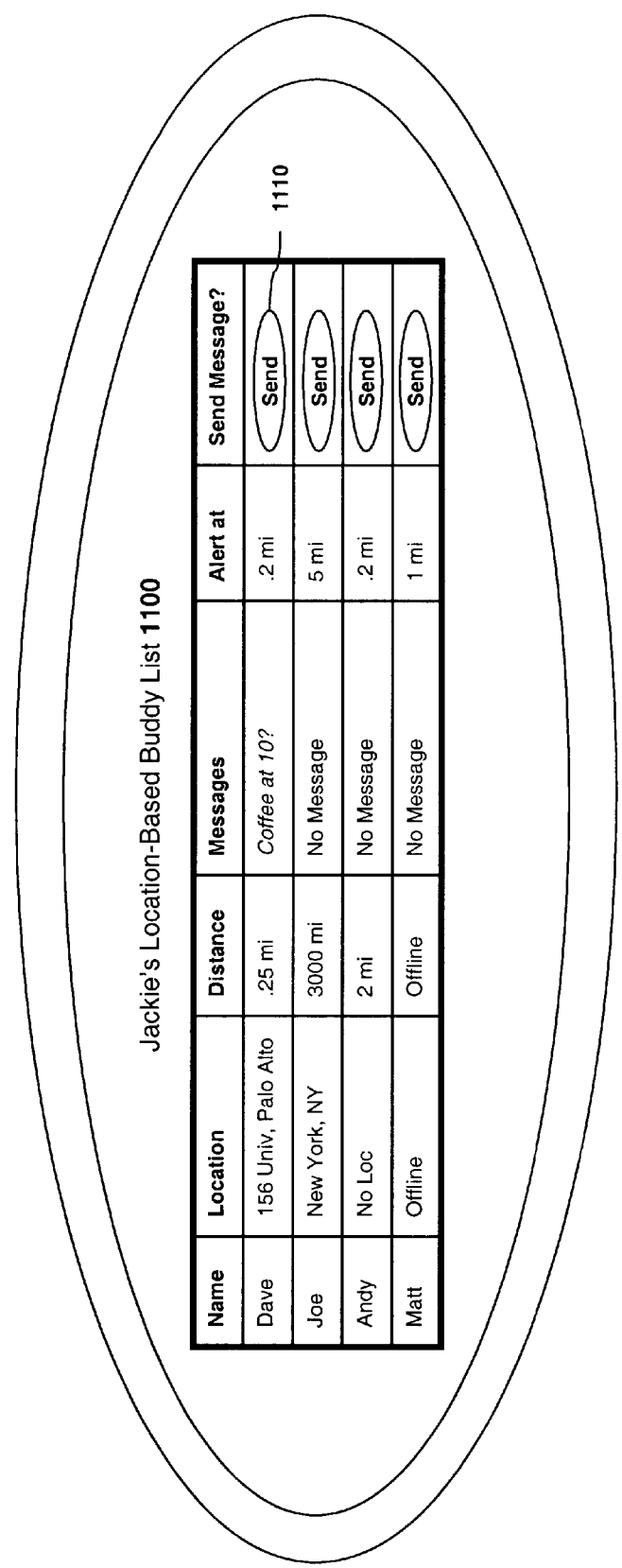
FIG. 11 illustrates a location-based buddy list according to one embodiment of the invention.

FIG. 11 illustrates a location-based buddy list 1100 according to one embodiment of the invention. As indicated, the buddy-list 1100 includes a column of user names identifying the users (or "buddies") for which the creator of the buddy list 1100, "Jackie" in the illustrated example, will transmit and receive positional data. For each user, the list 1100 may include specific positional data (e.g., 156 University Ave, Palo Alto) and/or a distance indication (e.g., 0.25 miles) specifying how far away the user is from the creator of the buddy list 1100. As mentioned above, these variables may or may not be transmitted for certain users depending on the profiles of those users (e.g., some users such as user "Andy" in the example may not want precise location data transmitted to other users).

The list 1100 may also include the actual messages transmitted by each of the users (e.g., transmitted along with the users' positional data). For example, in the illustrated embodiment, a user named "Dave" transmits a message asking Jackie she wants to have "coffee at 10." Jackie may make a decision based on Dave's location (e.g., 0.2 miles from Jackie in the example shown in FIG. 11). In one embodiment, the actual message will not appear in the buddy list 1100. Rather, a link to the message (e.g., a pointer such as a URL) will appear in the list 1100 and, by selecting the link, the creator of the list may view the message (i.e., it will be retrieved from the portal server 110).

The creator of the buddy list 1100 may also set alert levels specifying a range of user locations within which an alert should be generated. Thus, in the example shown in FIG. 11, Jackie indicates that users Dave and Andy should generate an alert if they are within 0.2 miles of her; Joe within 5 miles; and Matt within 1 mile. Accordingly, in this embodiment, the positional data for each user may not necessarily be transmitted concurrently with an instant message. For example, in one embodiment, the portal device for each user may transmit positional data on a periodic basis. Alternatively, or in addition, the portal device for each user may transmit positional data for that user whenever the user moves from one position to the next. In one embodiment, the portal server 110 will query each portal device for positional data on a periodic basis and transmit the updated positional information to all other devices configured to receive it.

Embodiments of the invention may include various steps as set forth above. The steps may be embodied in machine-executable instructions. The instructions can be used to cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Throughout the foregoing description, for the purposes of explanation, numerous specific details were set forth in order to provide a thorough understanding of the invention. It will be apparent, however, to one skilled in the art that the invention may be practiced without some of these specific details. For example, while the system described above employs a single portal server 110, alternative embodiments of the invention may include numerous different servers (e.g., database servers, web servers, etc), and/or mirrored servers distributed across a network. Moreover, while the embodiments described above focus on a portal device which executes interpreted code (e.g., Java bytecodes), the principles of the invention may also be implemented on devices which execute non-interpreted code. Accordingly, the scope and spirit of the invention should be judged in terms of the claims which follow.

What is claimed is:

1. A computer-implemented method comprising:

storing a first user's instant messaging buddy list, the instant messaging buddy list identifying users with whom the first user conducts instant messaging sessions, specifying a plurality of users identified in said buddy list who are to receive an indication of a position of said first user and, for each individual user of said plurality of users, specifying a level of precision with which to identify said first user's position;

identifying a position of said first user using one or more position identification techniques; and transmitting said first user's position to each of said plurality of users at said specified levels of precision identified for each of said plurality of users.

2. The method as in claim 1
wherein said levels of precision are specified in a configuration profile of said first user.

3. The method as in claim 1 wherein at least one of said specified levels of precision comprises a current city and state in which said first user is located.

4. The method as in claim 1 wherein at least one of said specified levels of precision comprises a highest level of precision possible using one or more position identification techniques.

5. The method as in claim 1 wherein at least one of said specified levels of precision comprises a distance from said first user to each of said plurality of users.

6. The method as in claim 1 wherein said first user's position is transmitted to each of said plurality of users during an instant messaging session with said plurality of users.

7. The method as in claim 1 further comprising:
identifying a position of one or more of said plurality of users using one or more of said position identification techniques; and
transmitting positions of each of said plurality of users to said first user at a specified level of precision identified by each of said plurality of users.

8. The method as in claim 1 wherein said first user's position is identified to said plurality of users within a location-based buddy list displayed for each of said plurality of users.

9. The method as in claim 1 further comprising:
generating an alert if one of said plurality of users moves within a location specified by said first user.

10. The method as in claim 1 wherein said position identification techniques comprise global positioning system ("GPS") techniques.

11. The method as in claim 1 wherein said position identification techniques comprise identifying a cell site from which said first user is communicating.

12. A system comprising:
a messaging module to coordinate message passing between a plurality of users
a user configuration profile for a first user, the user configuration profile specifying a level of precision with which to identify a position of said first user to each of a plurality of other users in said first user's buddy list;
a location tracking module to collect positional data for said first user using one or more position tracking techniques, said location tracking module to transmit said positional data to each of said plurality of other users at a level of precision specified in said first user's configuration profile.

13. The system as in claim 12 wherein at least one of said specified levels of precision comprises a current city and state in which said first user is located.

14. The system as in claim 12 wherein at least one of said specified levels of precision comprises a highest level of precision possible using said position tracking techniques.

15. The system as in claim 12 wherein at least one of said specified levels of precision comprises a distance from said first user to each of said plurality of users.

16. The system as in claim 12 wherein said first user's position is transmitted to each of said plurality of other users at said specified levels of precision identified for each of said plurality of other users during an instant messaging session with said plurality of users.

17. The system as in claim 12 wherein said location tracking module identifies a position of one or more of said plurality of other users using one or more position identification techniques; and
said messaging module transmits positions of each of said plurality of users to said first user at a specified level of precision stored in configuration profiles of said other users.

18. The system as in claim 12 wherein said position tracking techniques comprise global positioning system ("OPS") techniques.

19. An article of manufacture including program code which, when executed by a machine, cause said machine to perform the operations of:
storing a first user's instant messaging buddy list, the instant messaging buddy list identifying users with whom the first user conducts instant messaging sessions;
specifying a plurality of users identified in said buddy list who are to receive an indication of a position of said first user and, for each individual user of said plurality of users, specifying a level of precision with which to identify said first user's position;
identifying a position of said first user using one or more position identification techniques; and
transmitting said first user's position to each of said plurality of users at said specified levels of precision identified for each of said plurality of users.

20. The article of manufacture as in claim 19
wherein said levels of precision are specified in a configuration profile of said first user.

21. The article of manufacture as in claim 19 wherein at least one of said specified levels of precision comprises a current city and state in which said first user is located.

22. The article of manufacture as in claim 19 wherein at least one of said specified levels of precision comprises a highest level of precision possible using one or more position identification techniques.

23. The article of manufacture as in claim 19 wherein at least one of said specified levels of precision comprises a distance from said first user to each of said plurality of users.

24. The article of manufacture as in claim 23 wherein said instant messaging buddy list further comprises an alert field associated with each of said plurality of users, each of said alert field fields specifying a distance within which an alert will be generated if one of said plurality of users associated with said alert field moves within said distance.

25. The article of manufacture as in claim 19 wherein said first user's position is transmitted to each of said plurality of users at said specified levels of precision during an instant messaging session with said plurality of users.

26. An article of manufacture including program code which, when executed by a machine, cause said machine to perform the operations of:
receiving positional data identifying a wireless device's position responsive to a first user transmitting a message from said wireless device to one or more other users;
formatting said positional data according to a configuration profile of said first user, said configuration profile identifying a plurality of other users who should receive positional data associated with said first user and also identifying, for each of said other users, a level of precision with which to identify said first user; and
transmitting said positional data to each said plurality of other users at said specified level of precision.

27. The article of manufacture as in claim 26 wherein at least one of said specified levels of precision comprises a current city and state in which said first user is located.

28. The article of manufacture as in claim 26 wherein at least one of said specified levels of precision comprises a highest level of precision possible using said position tracking techniques.

29. The article of manufacture as in claim 28 wherein at least one of said specified levels of precision comprises a distance from said first user to each of said plurality of other users.

30. The article of manufacture as in claim 26 wherein said message is an instant message.

31. The article of manufacture as in claim 26 including additional program code which, when executed by said machine, cause said machine to perform the operations of:

transmitting positional data identifying positions of said one or more other users to said first user at a level of precision specified by said one or more other users.

32. The article of manufacture as in claim 26 wherein said first user identifies said one or more other users via a location-based buddy list.

33. The article of manufacture as in claim 29 including additional program code which, when executed by said machine, cause said machine to perform the operations of:

generating an alert if one of said one or more other users moves within a distance from said first user specified by said first user.

34. The article of manufacture as in claim 33 wherein said location distance specified by said first user is different for each of said other users.

35. The article of manufacture as in claim 26 wherein said positional data is collected using global positioning system ("GPS") technology.

* * * * *